United States Patent Office 2,745,782
Patented May 15, 1956

2,745,782

PARASITICIDE COMPOSITION OF REDUCED PHYTOTOXICITY AND METHOD

Doane Stewart, Garden Grove, Calif., assignor to The Dow Chemical Company, Midland, Mich., a corporation of Delaware No Drawing. Application July 5, 1951, Serial No. 235,395

7 Claims. (Cl. 167—31)

This invention relates to parasitcide compositions, and is particularly directed to a composition of reduced phytotoxicity, and to a method for reducing the phytotoxicity of aqueous solutions of toxicants normally injurious to plants and plant parts.

2,4-dinitro-6-cyclohexyl-phenol and certain of its salts have been widely employed as ingredients of parasiticidal compositions for use as insecticides, fungicides and molluscacides, and particularly for the control of spider and spider mite organisms. These compounds have been found almost specific for spiders, and dusts and spray compositions comprising the free phenol and its relatively water soluble dicyclohexylamine salt have been accepted as arachnidicides in commercial practice for many years.

Other salt forms of 2,4-dinitro-6-cyclohexyl-phenol and particularly the lower alkanolamine salts have the property of being readily water soluble. Since these compounds retain the high parasiticidal activity of the parent phenol, the possible advantages in the use of simple aqueous solutions becomes immediately apparent. However, aqueous solutions of these compounds, in the amounts required for parasite control, have been found to be somewhat phytotoxic to plants and plant parts and particularly to the fruits of citrus.

It is an object of the present invention to provide an improved parasiticide composition comprising a lower alkanolamine salt of 2,4-dinitro-6-cyclohexyl-phenol as an active toxic ingredient. It is a further object to provide a such composition which will not be as phytotoxic as wounld normally be the case with a composition including a parasiticidal concentration of the identified amine salt. An additional object is to provide an aqueous spray mixture comprising a lower alkanolamine salt of 2,4-dinitro-6-cyclohexyl-phenol, which spray mixture will be safened against injury to plants and plant parts. A still further object is to supply a method for safening or rendering less phytotoxic aqueous dispersions of the lower alkanolamine salts of 2,4-dinitro-6-cyclohexyl-phenol. Other objects will become evident from the following specification and claims.

It has now been discovered that the normal phytotoxicity of the lower alkanolamine salts of 2,4-dinitro-6-cyclohexyl-phenol may be materially reduced if the latter be employed in combination with methylcellulose. This is particularly the situation where aqueous dispersions of the amine salt and methylcellulose are employed. These spray compositions are significantly less injurious to plants and plant parts than are similar compositions in which the methylcellulose is not employed.

The expression "lower alkanolamine," as herein employed, refers to hydroxy-alkylamines in which the alkyl structure is ethyl, propyl or butyl. Representative amines include monoethanolamine, diethanolamine, triethanolamine, the corresponding propanolamines and butanolamines, 2-aminopropanediol-1,3- and 1,3-diamino-isopropanol. The salts of these amines with 2,4-dinitro-6-cyclohexyl-phenol are for the most part yellow crystalline solids readily soluble in water. They are readily prepared by reacting the alkanolamine with a solution of the 2,4-dinitro-6-cyclohexyl-phenol in ethanol and thereafter recovering the desired salt product by recrystallization. Where mixtures of the alkanolamines or appreciable excesses are employed in the reaction, the mixed salt products obtained may be low freezing liquids.

Methylcellulose is a water-soluble cellulose ether derived by reacting purified cotton or wood cellulose (in the form of alkali cellulose) with methyl chloride. The degree of methoxyl substitution is approximately two groups per anhydro-glucose residue in the cellulose chain. The methoxyl content of the product varies from 27.5 to 31 per cent. Methylcellulose is frequently rated in terms of its aqueous solutions as being of low, medium and high viscosity types, of which 15, 400 and 4000 centipoise materials, respectively, are representative. The product is characterized by being soluble in cold water and substantially insoluble in hot water.

In the present operation, the methylcellulose may be employed in any suitable form. Thus, concentrates may be prepared comprising the amine salt compound in intimate dispersion with methylcellulose in the form of a finely divided powder. In a further modification, the amine salt and methylcellulose may be compounded together in water to produce a liquid concentrate adapted to be diluted to produce the ultimate spray mixture. Alternatively, an existent dilute aqueous dispersion of an operative concentration of either the amine salt compound or the methylcellulose may be modified by the addition of the desired proportion of the ingredient not already present therein, e. g. a concentrated aqueous solution of methylcellulose may be added with stirring to an existent dilute aqueous solution of a parasiticide mixture comprising an alkanolamine salt of 2,4-dinitro-6-cyclohexyl-phenol as an active toxicant.

The proportions of materials employed vary considerably with the intended end use of the composition. Thus, in a finished spray mixture, there may be present anything from an ounce or two, to several pounds of the alkanolamine salt per 100 gallons. In general, the methylcellulose should be employed in such quantity as to provide in the ultimate spray mixture at least one ounce of methylcellulose per 100 gallons. Good results have been obtained with 2 and 3 ounces of methylcellulose per 100 gallons of aqueous spray. In practice, somewhat smaller proportions are operable when employing high viscosity type than with low viscosity type methylcellulose.

It is to be understood that any suitable wetting and dispersing agent may be employed in either the concentrate or diluted spray, e. g., sodium lauryl sulfate, alkali metal salts of aromatic sulfonic acids, and esters of sulfated aliphatic derivatives. Similarly, other adjuvants such as mutual solvents, freezing point depressants, stabilizers and supplementary toxicants may be included in the described compositions.

The following examples illustrate the invention but are not to be construed as limiting:

Example 1

The triethanolamine salt of 2,4-dinitro-6-cyclohexyl-phenol (melting point 90°–92.5° C.) and 15 centipoise methyl cellulose were incorporated into a parasiticidal spray. This was accomplished by dispersing 23.2 parts by weight of 2,4-dinitro-6-cyclohexyl-phenol and 13.4 parts by weight of triethanolamine in 29.2 parts by weight of isopropanol and 34.2 parts of water. This results in the formation of a liquid solution of the triethanolamine salt of 2,4-dinitro-6-cyclohexyl-phenol, having a freezing point of 20°–32° F. This solution was employed as a "base concentrate" for use in the preparation of spray-mixtures.

Methylcellulose of 15 centipoise viscosity rating was dispersed in water in the amount of 2 ounces per 100 gallons. In this step, the methylcellulose was added in the form of a 5 per cent by weight stock solution. To the methylcellulose dispersion, 1 quart of the "base concentrate" was added with thorough mixing to obtain a spray-mixture hereinafter identified as "A."

For purpose of comparison, a spray-mixture "B" was prepared by dissolving the same proportion of the "base concentrate" in water containing dioctyl ester of sodium sulfosuccinic acid (Vatsol OT) in the amount of two ounces per 100 gallons. As a check, 1 quart of the "base concentrate" was dispersed in 100 gallons of water to obtain a spray-mixture "C."

The three spray mixtures were applied in conventional fashion so as thoroughly to wet all exterior surfaces of mature lemon fruits. These fruits were examined after 17 days of exposure to wind, sun and general weathering under sub-tropical conditions to determine the degree of injury, if any, attributable to the treatments. It was found that no significant injury was caused by spray-mixture "A." With spray-mixture "B" there was commercially objectionable injury in the form of pitting, russeting and blossom end injury where the spray residues were most concentrated. With spray-mixture "C" there was such severe overall injury of the lemons as to preclude their being marketed.

*Example 2*

In a similar fashion, the three spray-mixtures were applied to determine phytocidal activity on oranges. Again, fruits were collected after 17 days and examined for injury attributable to the spray applications. No injury whatever was observed on the mature fruits as sprayed with spray-mixture "A." Significant ring or blossom-end injury was found on the oranges treated with the spray-mixtures "B" and "C" and on which residues of these compositions had dried and weathered.

*Example 3*

Compositions comprising as active toxic ingredients other alkanolamine salts of 2,4-dinitro-6-cyclohexyl-phenol and safened with methylcellulose are as follows:

Composition D: Parts by weight
Monoethanolamine salt of 2,4-dinitro-6-cyclohexyl-phenol (M. P. 150°–151° C.) _____ 60
Methylcellulose (4000 centipoise) _____ 20
Sodium lauryl sulfate _____ 20

The foregoing, when intimately ground together, constitutes a concentrate adapted to be diluted with water to form a spray mixture of reduced phytocidal properties.

Composition E: Parts by weight
Triisopropanolamine salt of 2,4-dinitro-6-cyclohexyl-phenol (M. P. 112°–114° C.) _ounces__ 6
Methylcellulose (400 centipoise) _____do____ 2
Water _____gallons__ 100

This composition is adapted to be employed as a spray-mixture for the control of mite and spider mite organisms.

Composition F: Parts by weight
2-amino-2-methyl-1,3-propanediol salt of 2,4-dinitro-6-cyclohexyl-phenol (M. P. 173°–175° C.) _____ 50
Methylcellulose (15 centipoise) _____ 50

The listed constituents are milled together and subsequently dispersed in water to obtain spray compositions containing from 4 to 6 ounces of the amine salt per 100 gallons. These are adapted to be employed for the control of mite organisms on growing vegetation.

Other lower alkanolamine salts of 2,4-dinitro-6-cyclohexyl-phenol, which may be similarly compounded, include the following: 2-amino-2-methyl-propanol salt M. P. 140° C. (with decomposition), diethanolamine salt M. P. 112°–115° C., diamino-isopropanol mono salt M. P. 190°–191° C., and 2-amino-2-ethyl-1,3-propanediol salt M. P. 180°–182° C.

I claim:

1. A parasiticide composition comprising a lower alkanolamine salt of 2,4-dinitro-6-cyclohexyl-phenol and methylcellulose, the latter being present in such proportions as to accomplish a reduction in the phytotoxic properties of the amine salt in aqueous solution.

2. An aqueous parasiticide composition comprising dispersed therein (1) a lower alkanolamine salt of 2,4-dinitro-6-cyclohexyl-phenol as an active toxicant, and (2) sufficient methylcellulose to accomplish a reduction in the phytotoxic properties of the amine salt.

3. An aqueous parasiticide composition comprising dispersed therein a lower alkanolamine salt of 2,4-dinitro-6-cyclohexyl-phenol and at least 1 ounce of methylcellulose per 100 gallons of mixture.

4. A composition in accordance with claim 1 in which the amine salt compound is an ethanolamine salt of 2,4-dinitro-6-cyclohexyl-phenol.

5. A composition in accordance with claim 2 in which the amine salt compound is triethanolamine salt of 2,4-dinitro-6-cyclohexyl-phenol.

6. A composition in accordance with claim 3 in which the methylcellulose is of a low viscosity rating.

7. A method for reducing the normal phytotoxicity of aqueous solutions of the lower alkanolamine salts of 2,4-dinitro-6-cyclohexyl-phenol which includes the step of dispersing in such aqueous solutions methylcellulose in the amount of at least 1 ounce per 100 gallons of solution.

References Cited in the file of this patent

UNITED STATES PATENTS

| | | |
|---|---|---|
| 2,146,739 | Heath | Feb. 14, 1939 |
| 2,166,122 | Boyce | July 18, 1939 |
| 2,166,123 | Boyce | July 18, 1939 |
| 2,196,988 | Heath | Apr. 16, 1940 |
| 2,222,486 | Moore | Nov. 19, 1940 |
| 2,225,619 | Britton | Dec. 24, 1940 |
| 2,328,505 | Smith | Aug. 31, 1943 |
| 2,369,137 | Coleman | Feb. 13, 1945 |
| 2,369,992 | Treacy | Feb. 20, 1945 |
| 2,392,859 | Meuli | Jan. 15, 1946 |
| 2,495,270 | Littler | Jan. 24, 1950 |
| 2,499,396 | Lynn | Mar. 7, 1950 |
| 2,519,780 | Morrill | Aug. 22, 1950 |
| 2,524,728 | Hammer | Oct. 3, 1950 |
| 2,528,544 | Pijoan | Nov. 7, 1950 |
| 2,547,261 | Geiger | Apr. 3, 1951 |
| 2,553,577 | Hale | May 22, 1951 |

FOREIGN PATENTS

| | | |
|---|---|---|
| 597,483 | Great Britain | Jan. 27, 1948 |

OTHER REFERENCES

The Journal of Investigative Dermatology, 1946, pgs. 239 to 252, "Fungistatic Agents for Treatment of Dermatophytosis," pg. 246 pertinent.